US007903666B1

(12) United States Patent
Kumar et al.

(10) Patent No.: US 7,903,666 B1
(45) Date of Patent: Mar. 8, 2011

(54) METHOD AND SYSTEM FOR COMPRESSING ROUTE ENTRIES IN A ROUTE TABLE BASED ON EQUAL-COST MULTI-PATHS (ECMPS) MATCHES

(75) Inventors: Dilip Kumar, Santa Clara, CA (US); Kesavan Thiruvenkatasamy, Santa Clara, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 269 days.

(21) Appl. No.: 12/101,026

(22) Filed: Apr. 10, 2008

Related U.S. Application Data

(63) Continuation-in-part of application No. 12/059,884, filed on Mar. 31, 2008, now abandoned.

(51) Int. Cl.
*H04L 12/56* (2006.01)
(52) U.S. Cl. .................................. 370/395.31
(58) Field of Classification Search .............. None
See application file for complete search history.

(56) References Cited

U.S. PATENT DOCUMENTS

| 6,192,051 | B1 * | 2/2001 | Lipman et al. ............... 370/389 |
| 7,453,883 | B1 * | 11/2008 | Lynch et al. .............. 370/395.32 |
| 2002/0131432 | A1 * | 9/2002 | Bachmutsky et al. ........ 370/408 |
| 2009/0300759 | A1 * | 12/2009 | Wang et al. ..................... 726/22 |

OTHER PUBLICATIONS

Liu, Huan: "Reducing Routing Table Size Using Ternary-CAM", Proceedings Hot Interconnect 9, Stanford, CA, 2001; IEEE Micro, Jan./Feb. 2002; 5 pages.

\* cited by examiner

*Primary Examiner* — Chirag G Shah
*Assistant Examiner* — Salvador E Rivas
(74) *Attorney, Agent, or Firm* — Blakely Sokoloff Taylor & Zafman LLP

(57) ABSTRACT

A route compression algorithm is applied to route entries of a route table. The route entries are maintained as nodes in a routing tree. The compression algorithm compresses child nodes having a common gateway with their respective parent nodes. The route entries associated with uncompressed nodes are installed into a forwarding table of a routing device that employs longest prefix match (LPM) lookup to forward data packets.

18 Claims, 6 Drawing Sheets

METHOD AND SYSTEM FOR COMPRESSING ROUTE ENTRIES IN A ROUTE TABLE BASED ON EQUAL-COST MULTI-PATHS (ECMPS) MATCHES

FIELD

This application is a Continuation-in-Part of U.S. patent application Ser. No. 12/059,884 by Dilip Kumar and Kesavan Thiruvenkatasamy, filed Mar. 31, 2008 now abandoned, and entitled "Method for Reducing IP Forwarding Table Size," and claims priority thereto.

Embodiments of the invention relate to networking, and more particularly to IP route tables.

BACKGROUND

The size of the typical Internet Protocol (IP) route table has increased by an order of magnitude in the last few years. The dramatic growth of routing tables necessitates more router memory space and processing power. For example, the number of prefixes in the Border Gateway Protocol (BGP) core routing table is approximately 240,000, and is increasing.

As the number of IP routes increases, an increasing amount of memory is required for both slow path forwarding and fast path forwarding (data plane) of a routing switch device.

The data (or forwarding) plane defines the part of a router architecture that decides what to do with packets arriving on an inbound interface. Most commonly, the data plane references a forwarding/route table to look up the destination address in the incoming packet header, and retrieve information that describes the outgoing interface(s) through which to send the incoming packet. The data plane generally stores IP routes of the forwarding/route table in specialized hardware designed for efficient lookup. One example of such hardware is a ternary content addressable memory, or TCAM.

As the IP forwarding/route table size increases, it requires more TCAM space. TCAMs are expensive chips and they consume more power and dissipate more heat, which imposes significant challenges on the system designer. Thus, increasing the number of TCAM chips on a routing switch device is not a practical or cost effective alternative. IP routes may cause TCAM table overflow, which results in un-deterministic IP forwarding behavior. In other words, some of the data traffic might be forwarded along a non-optimal path and some data traffic might be slow-path forwarded.

SUMMARY OF THE INVENTION

A route compression algorithm is applied to route entries of a route table. The route entries are maintained as nodes in a routing tree, such as a radix tree, Patricia tree, or trie. The compression algorithm compresses child nodes having a common gateway with their respective parent nodes. In other words, for a particular node, any routes associated with children of that node having the same gateway are removed or simply not included in the routing device's forwarding table. Thus, the route entries associated with uncompressed nodes are installed into a forwarding table of the routing device. In various embodiments, the routing device employs longest prefix match (LPM) lookup to forward data packets.

When a new route is added or updated, the compression algorithm is applied to determine if the new route and/or its immediate child can be compressed/uncompressed. When an existing route is deleted from the route manager database, the compression algorithm finds the associated parent node and the immediate children to determine whether any children need to be compressed/uncompressed.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
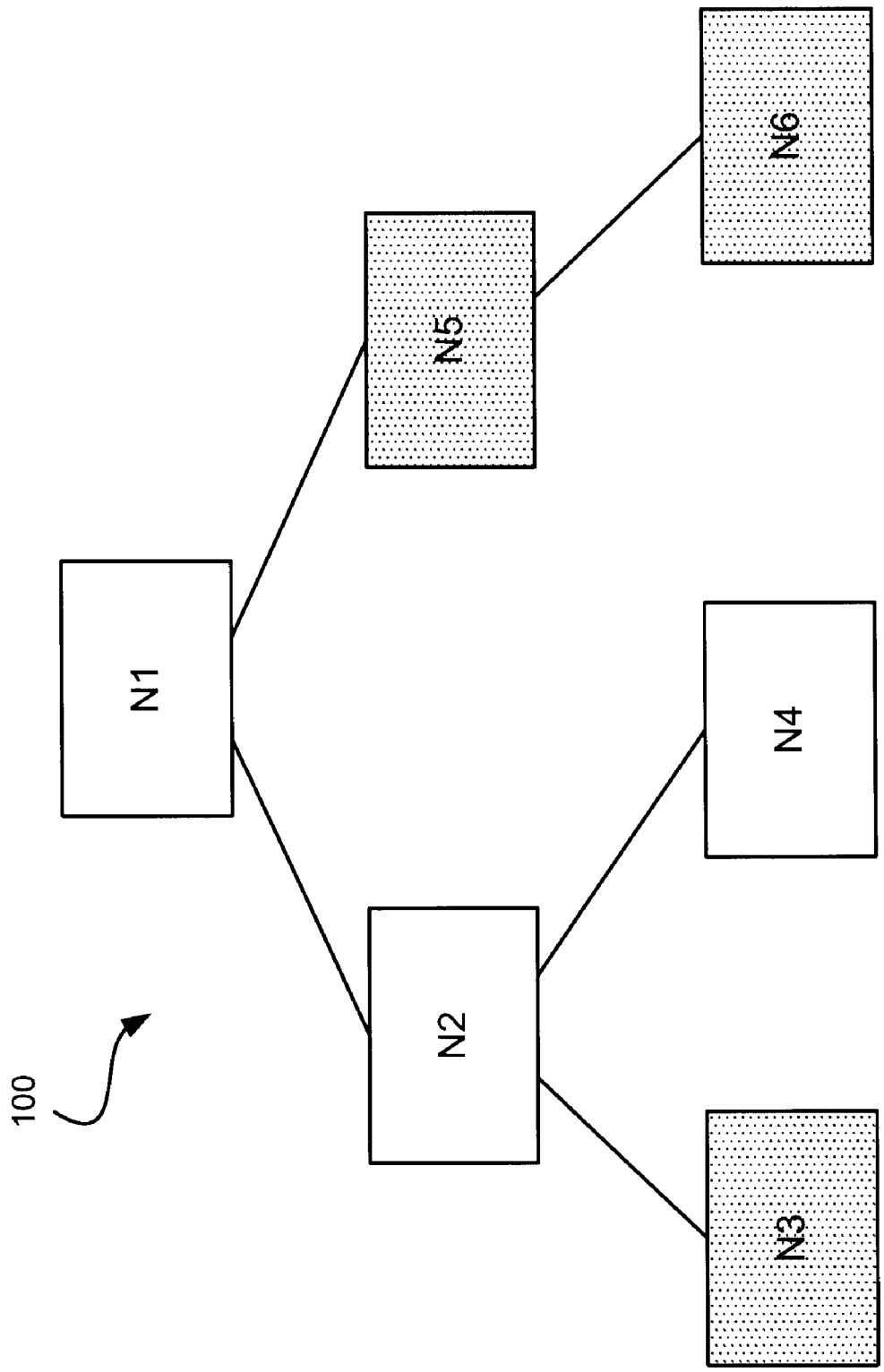
FIG. 1 is a block diagram illustrating nodes of a routing tree according to various embodiments.

As provided herein, methods, apparatuses, and systems enable reduction of IP route table size via a route compression algorithm. The number of possible egress paths in a routing table is typically small because only a limited number of interface cards can fit into a router chassis. In contrast, the number of routing prefixes is typically very large—in the range of several hundred thousand.

Internet Protocol (IP) route tables consist of route entries. A route entry contains an IP prefix and a corresponding gateway (or interface ID) through which data will be forwarded. An IP prefix, or simply prefix, is an IP address followed by a subnet mask. For example, the prefix "192.168.224.0/24" has an IP network address of 192.168.224.0 and a subnet mask of 24. A subnet mask reveals how much of the IP address should be used for the subnet ID and how much is left for the actual host ID. Thus, a subnet mask of 24 means that the first 24 bits (first 3 octets) of the IP address should be used for the subnet ID. As used herein, a first prefix is "longer" than a second prefix if the subnet mask of the first prefix is longer than the subnet mask of the second prefix.

A gateway is a node on a network that serves as an entrance to another network. In enterprises, the gateway could be, for example, the interface (e.g., port on a switch, etc.) that routes the traffic from a workstation to the outside network that is serving the Web pages. In homes, the gateway could be, for example, the Internet Service Provider (ISP) that connects the user to the internet.

An IP route table is generally maintained as or represented by a specialized tree (e.g., radix tree, Patricia tree, or trie) for efficient lookup (e.g., longest prefix match (LPM)). By exploiting the properties of the specialized tree, embodiments described herein gain performance advantages over other route compression techniques. The specialized tree maintains IP prefixes in such a way that any node in the tree is a sub-route of all its children. In other words, a child node in the tree is a super-route of its parent node. The term "node" is used interchangeably herein to refer to a route and/or a prefix given that a node is representative of a route and/or a prefix.

The term "route table" is frequently used generically to describe any table having routing entries. Route tables, generically, are frequently stored in a route manager database, although they could also be store elsewhere (e.g., RAM, flash memory, etc.) Herein, the route table used for slow-path forwarding is referred to as the "software route table." The route table available in the data plane (e.g., in a TCAM, etc.) is referred to as the "hardware route table." The term "forwarding table" is used herein to refer to both the software route table and the hardware route table. The route table associated with the routing process is referred to below as simply the "route table."

Though embodiments described herein may refer to a TCAM as storing IP route entries, embodiments of the invention are hardware independent. Any hardware can be used provided that the associated device uses longest prefix match (LPM) based lookup to forward data packets.

The route compression algorithms reduce the number of routing entries to be stored in the forwarding table without altering the actual data forwarding behavior. Note that the algorithms described herein will not reduce the size of the routing table associated with the routing process—the routing process's routing table will still hold all the routing entries. However, the routing process will apply the route compression algorithm before installing the routes into the forwarding table.

The basic concepts of the route compression algorithm are as follows:

$|P_a|$ denotes the length of the prefix $P_a$ $P_{a,i}$ denotes the ith bit of the prefix where $P_{a,1}$ is the most significant bit and $P_{a,|Pa|}$ is the least significant bit.

A prefix Pa is the parent of prefix Pb if the following three conditions hold:
1. $|P_a|<|P_b|$
2. $P_{a,i}=P_{b,i}$ for all $1<i<|P_a|$
3. There is no prefix $P_c$ such that $|P_a|<|P_c|<|P_b|$, and $P_{c,i}=P_{b,i}$ for all $1<i<|P_c|$ If $P_a$ and $P_b$ share the same egress gateway, then $P_b$ is the redundant route and need not be installed into the forwarding database. In other words, $P_b$ can be compressed.

FIG. 1 illustrates a sample routing process's route table. Nodes N1-N6 are the routing entries of the sample route table 100. The route and associated gateway information for each entry is given in Table 1 below:

TABLE 1

| Prefix | Route | Gateway |
| --- | --- | --- |
| N1 | 10.0.0.0/8 | 20.1.10.22 |
| N2 | 10.1.0.0/16 | 30.1.10.33 |
| N3 | 10.1.10.0/24 | 30.1.10.33 |
| N4 | 10.1.20.0/24 | 20.1.10.22 |
| N5 | 10.2.10.0/24 | 20.1.10.22 |
| N6 | 10.2.10.34/32 | 20.1.10.22 |

Here, the nodes N1 (10.0.0.0/8) and N5 (10.2.10.0/24) have the common gateway 20.1.10.22. N1 is the parent node of N5. Given that N1 and N5 have the same gateway, node N5 is redundant and need not be installed in the forwarding table. Without the entry N5, the data traffic that would otherwise be forwarded based on N5, will still be forwarded via the correct gateway using the parent entry N1. Similarly, the nodes N6 and N3 have the same gateway as their parents, N5 and N2, respectively. Hence N6 and N3 also need not be installed in the forwarding table.

Figure 2:
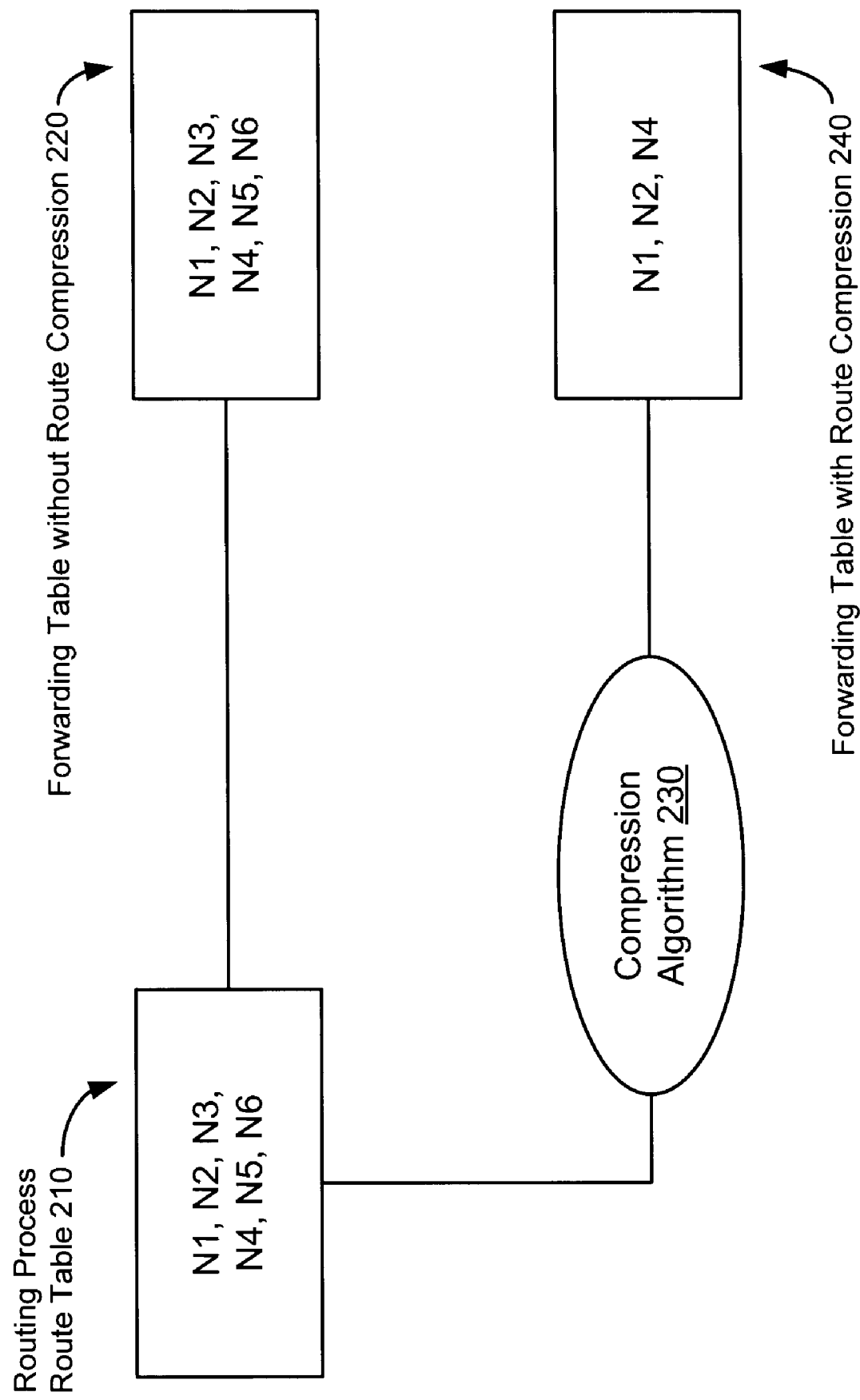
FIG. 2 is a block diagram illustrating a routing process route table according to various embodiments.

In various embodiments, the compression algorithm is applied before installing routes into the forwarding table of the routing device. If the compression algorithm finds that a route shall be compressed, then that route is not installed into the forwarding table. FIG. 2 shows that when compression algorithm 230 is applied to routing process route table 210, the resulting forwarding table 240 has fewer entries than forwarding table 220 (no route compression).

Figure 3:
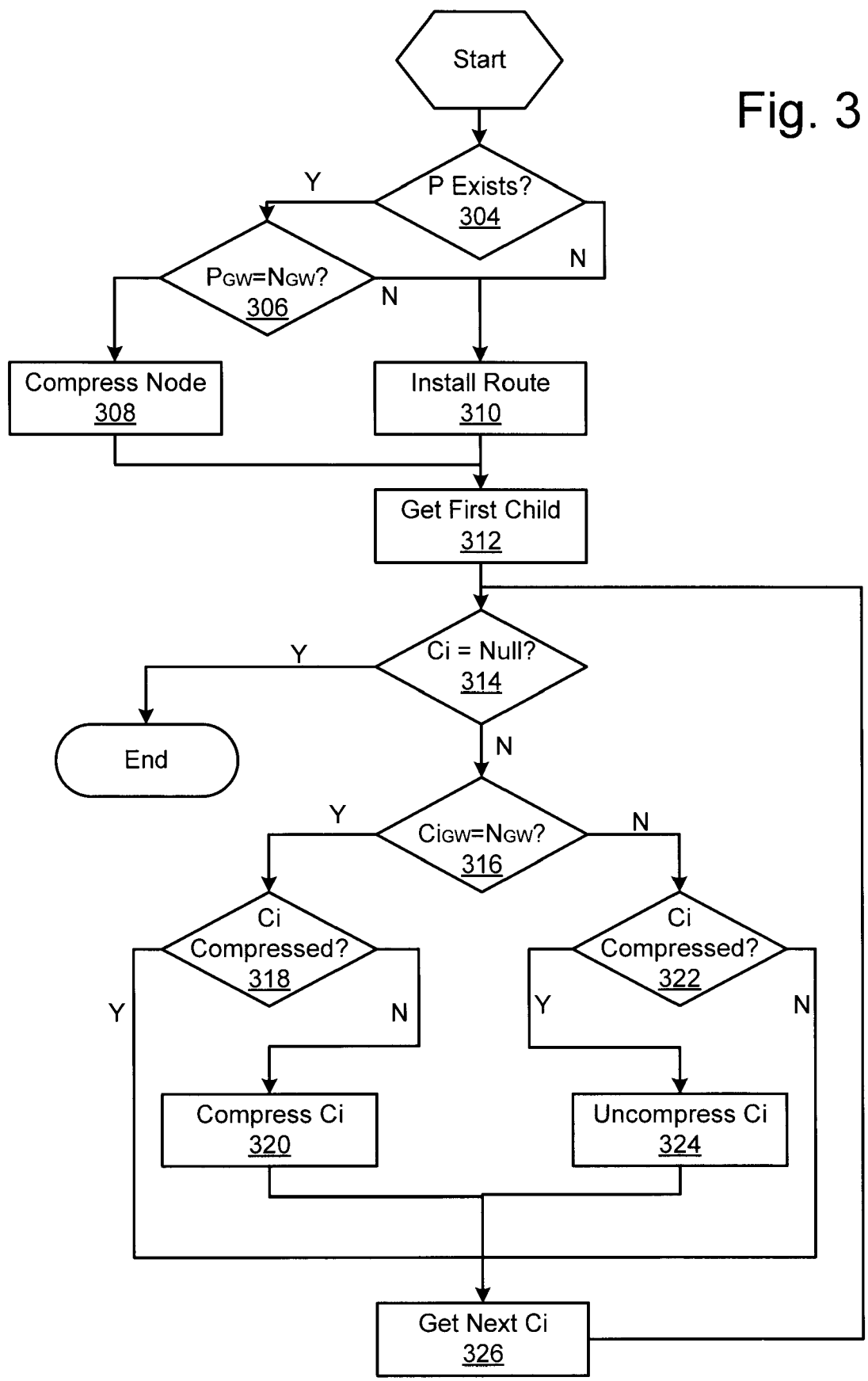
FIG. 3 is a flow diagram illustrating a process for reducing route table size according to some embodiments.

According to various embodiments, a compression algorithm is applied whenever a new IP prefix is added or updated to determine if the new route and/or its immediate child/children can be compressed/uncompressed. FIG. 3 is a flow diagram illustrating an example of such a compression algorithm for route addition/update.

The flow diagrams as illustrated herein provide an example of a sequence of various operations. Although shown in a particular sequence or order, unless otherwise specified, the order of the operations can be modified. Thus, the illustrated implementations should be understood only as examples, and operations can be performed in a different order, and some operations may be performed in parallel. Additionally, as provided in the description above, not all of the operations shown are necessarily required.

Referring now to FIG. 3, when a route (e.g., prefix) is added or updated, the algorithm begins by determining 304 whether there is an existing parent node P for the current node N (node N corresponds to the added/updated route). If no parent node exists, then the route cannot be compressed and thus the route is installed in the forwarding table 310. If node N has an associated parent node, then the algorithm determines 306 whether the parent gateway, $P_{GW}$, is the same as the gateway for the current node, $N_{GW}$. If the parent gateway and the node gateway are not equal, then the route associated with node N is installed in the forwarding table 310. However, if the parent gateway and the node gateway are equal, then node N is redundant and its associated route is compressed 308.

Once the route associated with node N has been compressed or installed, the algorithm finds 312 the first child node C1. If no child node exists 314, then the algorithm ends. If there is a child node C1 314, the algorithm determines 316 whether the child node's gateway is equal to the current node's gateway. If the child node gateway and the current node gateway are equal, then the child node can be compressed. Thus, the algorithm determines 318 whether the child node is already compressed. If the child node is not already compressed, then the algorithm compresses the child node 320.

If the child node gateway and the current node gateway are not equal, this means that the child node cannot be compressed because the child node's gateway is unique. Thus, the algorithm determines 322 whether the child node is compressed or not. If the child node is currently compressed, then the algorithm proceeds to uncompress the child node 324. Once the algorithm finishes with the first child node, the next child node (e.g., $C_2$) is retrieved 326 and the process is repeated for all remaining child nodes.

An example of a route addition according to embodiments of the invention is described as follows. Assume that there is initially only one route entry (i.e., prefix) in the routing process's route table. This prefix shall obviously be installed in the forwarding table since there is no parent prefix. This scenario can be seen in Table 2 below:

TABLE 2

Routing Tables—Initial stage

Routing Process's Route table

| Prefix | Gateway | Compressed? |
|---|---|---|
| 192.168.0.0/16 | 10.203.174.68 | NO |

Forwarding Table

| Prefix | Gateway |
|---|---|
| 192.168.0.0/16 | 10.203.174.68 |

Next, a new route (192.168.224.0/24) is added having the gateway 10.203.174.68. Given that this new route is the immediate child of the existing route (192.160.0.0/16) and it has the same gateway as its parent, the new route will be compressed. The new route tables are shown below:

TABLE 3

Routing Tables—After adding the 1$^{st}$ new route 192.168.224.0/24

Routing Process's Route table

| Prefix | Gateway | Compressed? |
|---|---|---|
| 192.168.0.0/16 | 10.203.174.68 | NO |
| 192.168.224.0/24 | 10.203.174.68 | YES |

Forwarding Table

| Prefix | Gateway |
|---|---|
| 192.168.0.0/16 | 10.203.174.68 |

Continuing with the example, assume that another new route (192.168.128.0/17) is added to the routing process route table with the gateway 17.32.45.69. When this route is added, the compression algorithm compares this route with its parent. Since this route's parent does not share a common gateway, this route cannot be compressed. The algorithm then checks for immediate children. Given that the child prefix (192.168.224.0/24) also does not share the gateway 17.32.45.69, the child prefix must also be uncompressed. The resulting tables are shown below:

TABLE 4

Routing Tables—After adding the 2$^{nd}$ new route 192.168.128.0/17

Routing Process's Route table

| Prefix | Gateway | Compressed? |
|---|---|---|
| 192.168.0.0/16 | 10.203.174.68 | NO |
| 192.168.128.0/17 | 17.32.45.69 | NO |
| 192.168.224.0/24 | 10.203.174.68 | NO |

Forwarding Table

| Prefix | Gateway |
|---|---|
| 192.168.0.0/16 | 10.203.174.68 |
| 192.168.128.0/17 | 17.32.45.69 |
| 192.168.224.0/24 | 10.203.174.68 |

Next, assume that another new route (192.0.0.0/8) is added to the routing process route table with the gateway 10.203.174.68. This route has only one immediate child (192.168.0.0/16). Given that the child has the same gateway as the parent, the child route shall be compressed and removed from the forwarding table, as seen below:

TABLE 5

Routing Tables—After adding the 3$^{rd}$ new route 192.0.0.0/8

Routing Process's Route table

| Prefix | Gateway | Compressed? |
|---|---|---|
| 192.0.0.0/8 | 10.203.174.68 | NO |
| 192.168.0.0/16 | 10.203.174.68 | YES |
| 192.168.128.0/17 | 17.32.45.69 | NO |
| 192.168.224.0/24 | 10.203.174.68 | NO |

Forwarding Table

| Prefix | Gateway |
|---|---|
| 192.0.0.0/8 | 10.203.174.68 |
| 192.168.128.0/17 | 17.32.45.69 |
| 192.168.224.0/24 | 10.203.174.68 |

Figure 4:
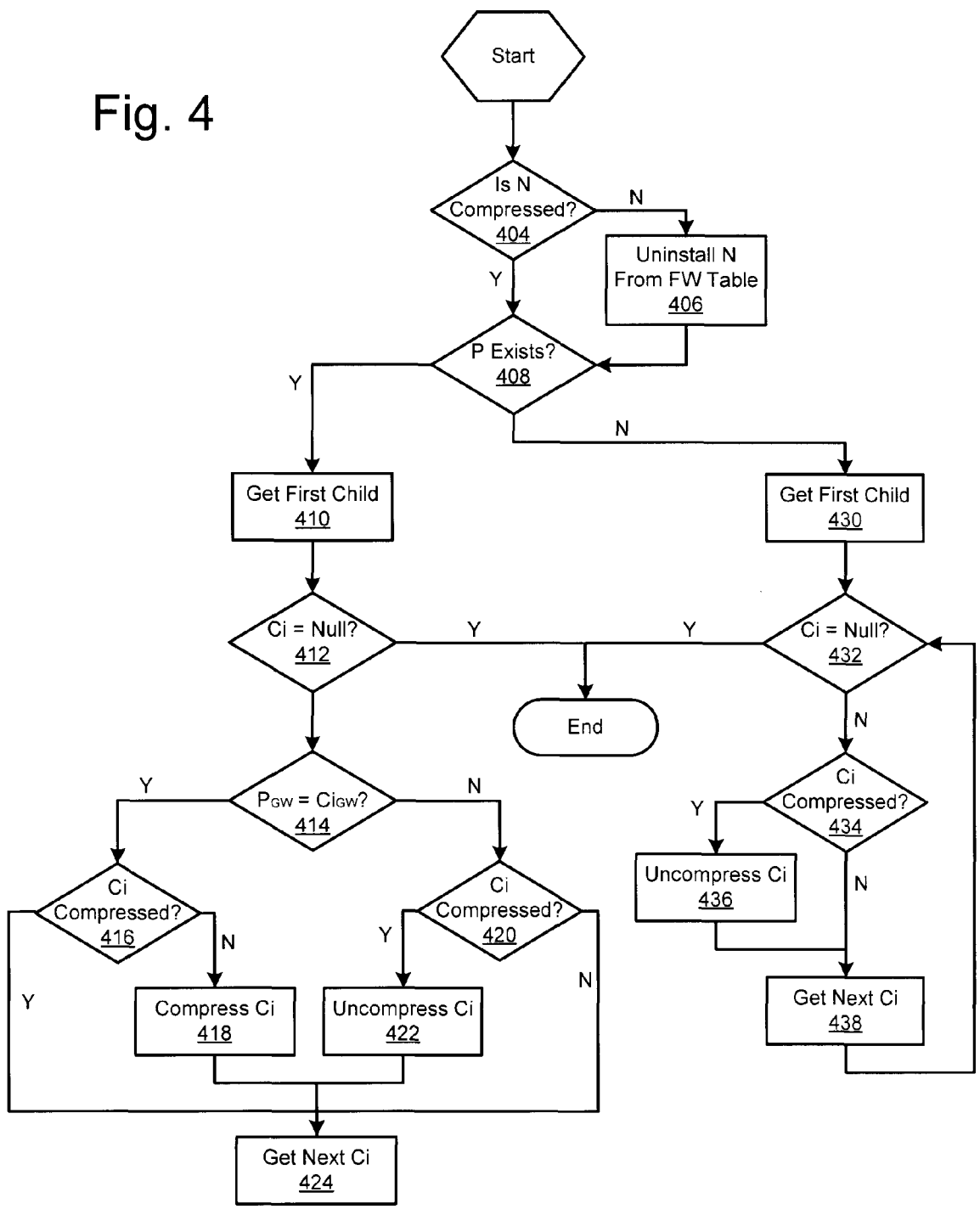
FIG. 4 is a flow diagram illustrating a process for reducing route table size according to some embodiments.

According to various embodiments, a compression algorithm is also applied whenever an existing IP prefix is deleted from the routing process route table. FIG. 4 illustrates an example of such a compression algorithm for route deletion.

When a route (e.g., prefix) is deleted, the algorithm begins by determining 404 whether the current node N (i.e., the route being deleted) is currently compressed. If node N is not compressed (i.e., it is installed in the forwarding table), then node N must be uninstalled from the forwarding table 406. The algorithm then determines 408 whether the current node N has a parent node P.

If a parent node P exists, the algorithm attempts to retrieve 410 the first child node $C_1$. If it is determined 412 that no child node exists, the algorithm ends. Otherwise, the algorithm determines 414 whether the child node gateway and the parent node gateway are the same. If the child node gateway and the parent node gateway are the same, then the child node should be compressed. Thus, if it is determined 416 that the child node is not already compressed, it will be compressed 418 by the algorithm. If the child node gateway and the parent node gateway are not the same, then the child node must be uncompressed. Thus, if it is determined 420 that the child node is currently compressed, then it will be uncompressed 422 by the algorithm. Once the algorithm finishes operating on the first child, the next child is retrieved 424.

In the case where it is determined 408 that a parent node P does not exist, the algorithm attempts to retrieve 430 the first child node $C_1$. If it is determined 432 that no child exists, the algorithm ends. Otherwise, the algorithm determines 434 whether the child node is currently compressed. Given that there is no parent node in this scenario, all child nodes must, by necessity, be uncompressed. Thus, if the child node is not already uncompressed, it will be uncompressed 436 by the algorithm. If the child node is already uncompressed, then no action needs to be taken and the next child node may be retrieved 438.

An example of a route deletion according to embodiments of the invention is described as follows. Assume that there are four route entries (i.e., prefixes) in the routing process's route table. For example, assume the same four route entries contained in the final version of the route table in the route addition/update example above:

TABLE 6

Routing Tables—before route deletion

Routing Process's Route table

| Prefix | Gateway | Compressed? |
|---|---|---|
| 192.0.0.0/8 | 10.203.174.68 | NO |
| 192.168.0.0/16 | 10.203.174.68 | YES |
| 192.168.128.0/17 | 17.32.45.69 | NO |
| 192.168.224.0/24 | 10.203.174.68 | NO |

Forwarding Table

| Prefix | Gateway |
|---|---|
| 192.0.0.0/0 | 10.203.174.68 |
| 192.168.128.0/17 | 17.32.45.69 |
| 192.168.224.0/24 | 10.203.174.68 |

If the route 192.169.128.0/17 is deleted, the routing tables would look like this:

TABLE 7

Routing Tables—After deleting the route 192.168.128.0/17

Routing Process's Route table

| Prefix | Gateway | Compressed? |
|---|---|---|
| 192.0.0.0/8 | 10.203.174.68 | NO |
| 192.168.0.0/16 | 10.203.174.68 | YES |
| 192.168.224.0/24 | 10.203.174.68 | YES |

Forwarding Table

| Prefix | Gateway |
|---|---|
| 192.0.0.0/8 | 10.203.174.68 |

When the 192.168.128.0/17 route is deleted, the compression algorithm compares its child node (192.168.224.0/24) with its parent (192.168.0.0/16). Since the parent node shares a common gateway with the child node, the child node must be compressed. Given that the route associated with child node was previously installed into the forwarding table, the route (192.168.224.0/24) is subsequently removed from forwarding table.

In embodiments that utilize equal-cost multi-path (ECMP) routing, the nodes that have ECMP paths are compressed only if certain conditions are met. If the conditions are not met, sub-optimal forwarding may occur. The conditions include:

The number of ECMP paths for a given node must match the number of ECMP paths of its parent node The set of gateways for the node must match exactly with the parent node's set of gateways Table 8 below illustrates an example of how the compression techniques described herein are applied for nodes with ECMP paths. Equal-cost multi-path routing (ECMP) is a routing strategy where next-hop packet forwarding to a single destination can occur over multiple "best paths" which tie for top place in routing metric calculations. Multi-path routing can be used in conjunction with most routing protocols, since it is a per-hop decision that is limited to a single router. The "Reason" field in Table 8 provides additional information explaining why compression is applied or not applied for a particular node. One of skill in the art will appreciate that such a "Reason" field is included for illustrative purposes and is not necessarily included in a routing device's route table, although it could be.

Routing Process's Route table

| Prefix | Gateways | Compressed? | Reason |
|---|---|---|---|
| 20.0.0.0/8 | Gw1: 30.1.10.1, Gw2: 50.1.10.1 | NO | This is the top node. |
| 20.1.10.0/24 | Gw1: 30.1.10.1 | NO | Number of gateways didn't match. This node has only one gateway, while the parent node has two. |
| 20.2.10.0/24 | Gw1: 30.1.10.1, Gw2: 60.1.10.1 | NO | Number of gateway is matching. But one of the ECMP paths (gateway 60.1.10.1) is not matching with its parent's ECMP paths. |
| 20.3.10.0/24 | Gw1: 30.1.10.1, Gw2: 50.1.10.1 | YES | Number of gateways is matching with its parent. Also all the gateways are matching with parent. |
| 20.4.10.0/24 | Gw1: 30.1.10.1, Gw2: 50.1.10.1 Gw3: 60.1.10.1 | NO | Number of gateways is not matching with its parent. |
| 20.1.10.44/32 | Gw1: 30.1.10.1 Gw2: 50.1.10.1 | NO | Number of gateway is not matching [This node has ECMP paths. But the parent node 20.1.10.0/24 doesn't have ECMP path.] |

TABLE 8

Routing Tables—For nodes with ECMP paths [When IP route Sharing enabled]
Forwarding Table

| Prefix | Gateway |
| --- | --- |
| 20.0.0.8/16 | Gw1: 30.1.10.1, Gw2: 50.1.10.1 |
| 20.1.10.0/24 | Gw1: 30.1.10.1 |
| 20.2.10.0/24 | Gw1: 30.1.10.1, Gw2: 60.1.10.1 |
| 20.4.10.0/24 | Gw1: 30.1.10.1, Gw2: 50.1.10.1 Gw3: 60.1.10.1 |
| 20.1.10.44/32 | Gw1: 30.1.10.1 Gw2: 50.1.10.1 |

Embodiments disclosed herein are protocol independent. For example, protocols such as Open Shortest Path First (OSPF), Routing Information Protocol (RIP), Border Gateway Protocol (BGP), Intermediate System-Intermediate System (ISIS), and other IPv4 and/or IPv6 protocols (e.g., Open Shortest Path First version 3 (OSPFv3) may be used in various embodiments.

Figure 5:
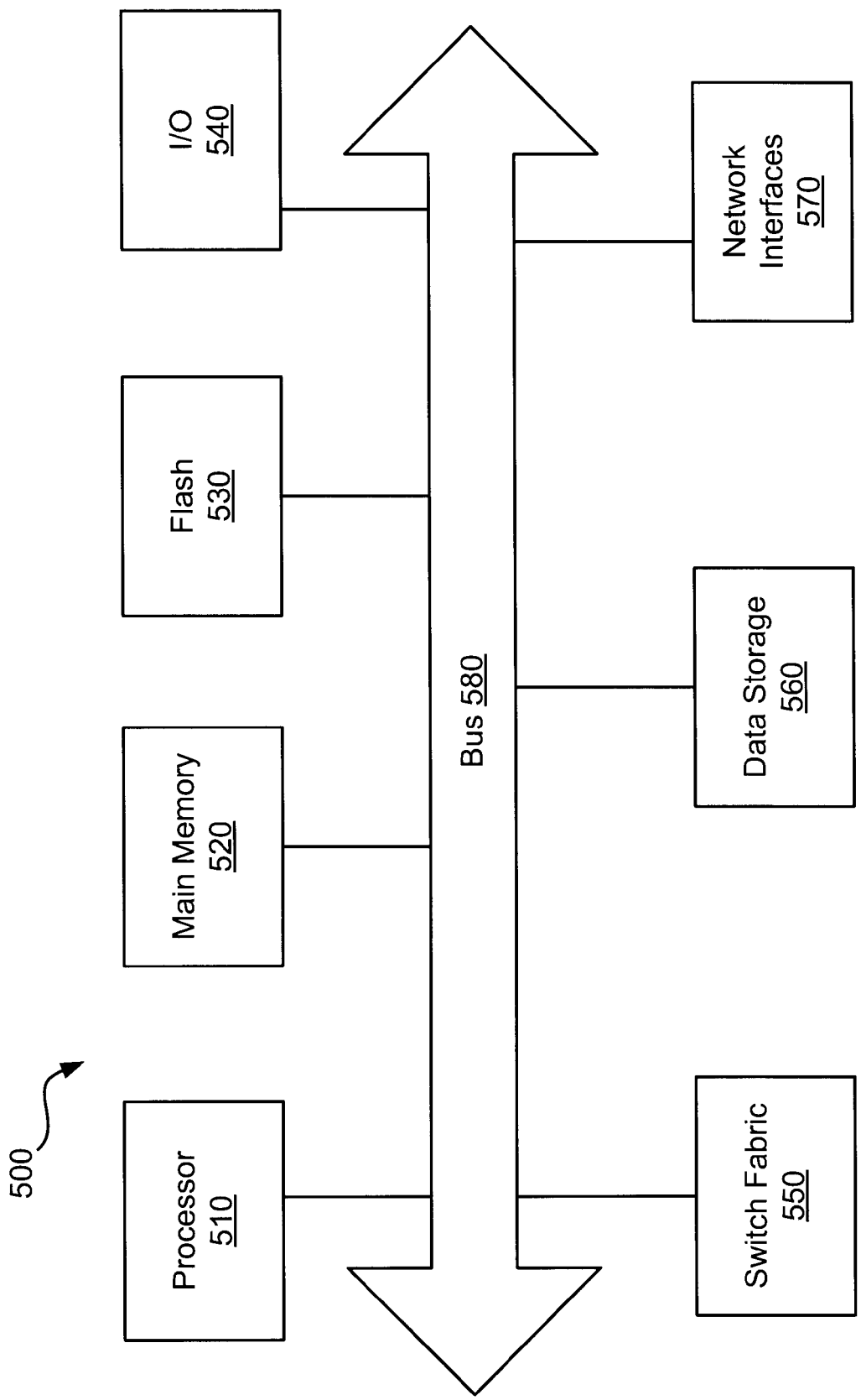
FIG. 5 is a block diagram illustrating a computing environment suitable for reducing IP forwarding table size according to various embodiments.

FIG. 5 illustrates computing environment in which certain aspects of the invention illustrated in FIGS. 1-4 may be practiced in various embodiments. Collectively, these components are intended to represent a broad category of hardware systems, including but not limited to general purpose computer systems and specialized network switches.

Computer system 500 includes processor 510, I/O devices 540, main memory 520 and flash memory 530 coupled to each other via a bus 580. Main memory 520, which can include one or more of system memory (RAM), and nonvolatile storage devices (e.g., magnetic or optical disks), stores instructions and data for use by processor 510. Additionally, the network interfaces 570, data storage 560, and switch fabric 550 are coupled to each other via a bus 580. Data storage 560 represents the routing database (i.e., route tables) described herein as well as other storage areas such as packet buffers, etc., used by the switch fabric 550 for forwarding network packets or messages.

The various components of computer system 500 may be rearranged in various embodiments, and some embodiments may not require nor include all of the above components. Furthermore, additional components may be included in system 500, such as additional processors (e.g., a digital signal processor), storage devices, memories, network/communication interfaces, etc.

In the illustrated embodiment of FIG. 5, the method and apparatus reducing route table size according to the present invention as discussed above may be implemented as a series of software routines run by computer system 500 of FIG. 5. These software routines comprise a plurality or series of instructions to be executed by a processing system in a hardware system, such as processor 510. Initially, the series of instructions are stored on a data storage device 560 (e.g., in a route manager database), memory 520 or flash 530.

Figure 6:
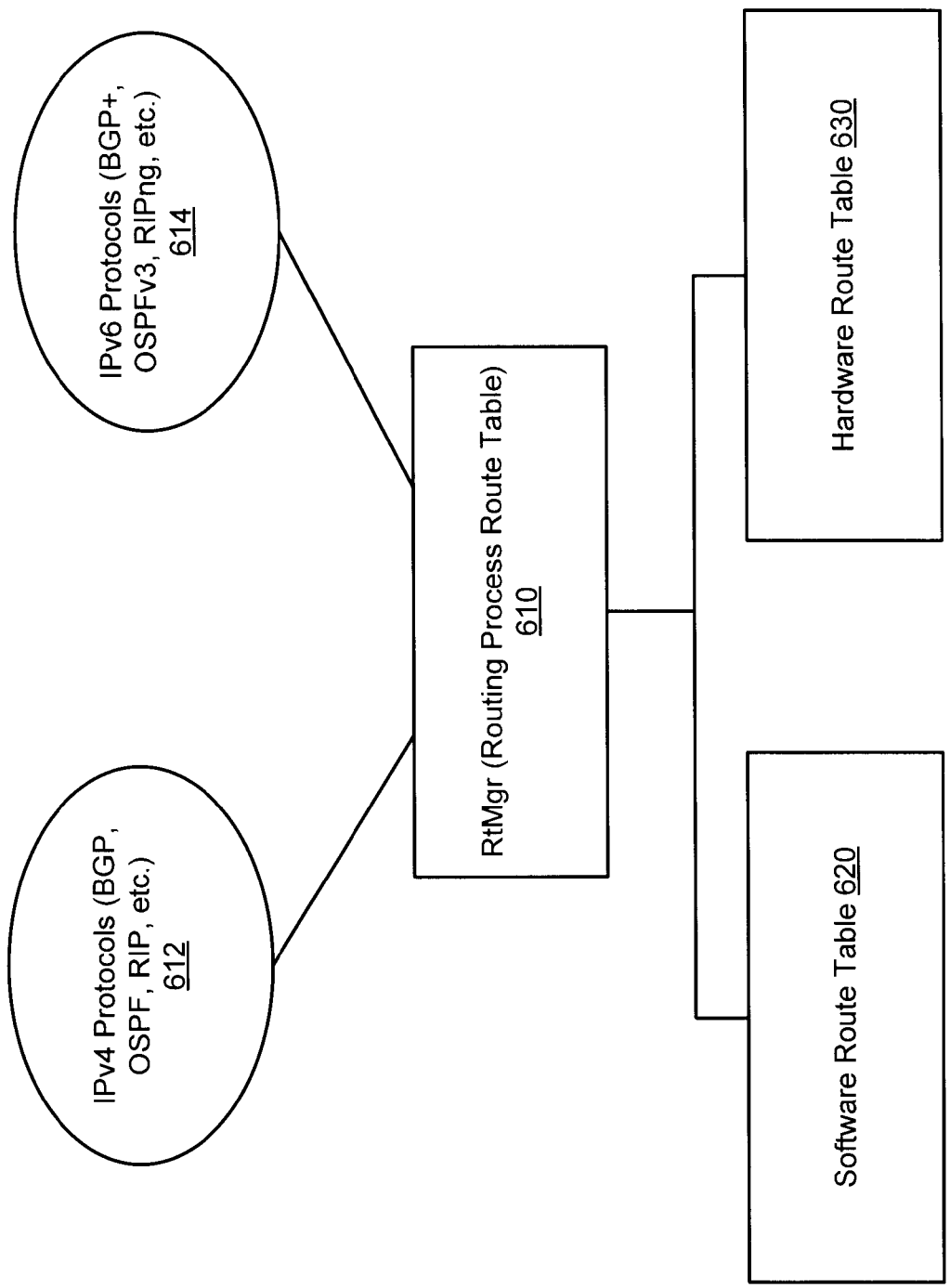
FIG. 6 is a block diagram illustrating route table organization according to various embodiments.

FIG. 6 is a block diagram illustrating route table organization according to various embodiments. As discussed above, the term "route table" is frequently used generically to describe any table having routing entries. Route tables, generically, are frequently stored in a route manager database, although they could also be store elsewhere (e.g., RAM, flash memory, etc.). The routing process route table 610 may include all route entries associated with a routing device or group of routing devices. Route entries in route table 610 originate from IPv4 protocols 612 and/or IPv6 protocols 614. Route table 610 determines/generates software route table 620 and hardware route table 630 in various embodiments.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method, comprising:
    maintaining route entries of a route table as nodes in a routing tree;
    compressing child nodes in the routing tree that have a common gateway with their respective parent nodes, wherein the compressing includes
        determining the nodes that have a equal-cost multi-path (ECMP), and
        compressing a child node for which a number of equal-cost multi-paths (ECMPs) matches with the number of ECMPs of a respective parent node and a set of gateways of the child node matches with the set of gateways of the respective parent node; and
    installing the route entries associated with uncompressed nodes into a forwarding table of a routing device that employs longest prefix match (LPM) lookup to forward data packets.

2. The method of claim 1, wherein each route entry comprises an Internet Protocol (IP) prefix and a gateway.

3. The method of claim 1, wherein the forwarding table is stored in one of a content-addressable memory (CAM), ternary content-addressable memory (TCAM), random access memory (RAM), dynamic RAM (DRAM), static RAM (SRAM) or a flash memory on the routing device.

4. The method of claim 1, wherein the route table is stored in a route manager database.

5. The method of claim 1, wherein the route table is implemented in a control plane and the forwarding table is implemented in a data plane.

6. The method of claim 1, wherein the routing tree is one or more of a radix tree, a Patricia tree, or a trie.

7. A method for compressing route entries in a route table where the route entries are maintained as nodes in a routing tree, the method comprising:
 for each current node
  compressing the current node if the current node has a parent node with a same gateway;
  determining whether the current node has any child nodes; for each child node
   compressing the child node if the child node is uncompressed and the child node and the current node have the same gateway, wherein the compressing includes determining the nodes that have a equal-cost multi-path (ECMP), and
    compressing a child node for which a number of equal-cost multi-paths (ECMPs) matches with the number of ECMPs of a respective parent node and a set of gateways of the child node matches with the set of gateways of the respective parent node;
   uncompressing the child node if the child node is compressed and the child node and the current node have different gateways; and
 installing the route entries associated with uncompressed nodes into a forwarding table of a routing device.

8. The method of claim 7, wherein the routing tree is one or more of a radix tree, a Patricia tree, or a trie.

9. The method of claim 7, wherein each route entry comprises an Internet Protocol (IP) prefix and a gateway.

10. A non-transitory computer-readable medium having content stored thereon to provide instructions to result in an electronic device performing operations including:
 maintaining route entries of a route table as nodes in a routing tree;
 compressing child nodes that have a common gateway with their respective parent nodes, wherein the compressing includes
  determining if the nodes have a equal-cost multi-path (ECMP), and
  compressing a child node with ECMP for which a number of equal-cost multi-paths (ECMPs) matches with the number of ECMPs of a respective parent node and a set of gateways of the child node matches with the set of gateways of the respective parent node; and
 installing the route entries associated with uncompressed nodes into a forwarding table of a routing device that employs longest prefix match (LPM) lookup to forward data packets.

11. The non-transitory computer-readable medium of claim 10, wherein each route entry comprises an Internet Protocol (IP) prefix and a gateway.

12. The non-transitory computer-readable medium of claim 10, wherein the route table is stored in a route manager database.

13. The non-transitory computer-readable medium of claim 10, wherein the route table is implemented in a control plane and the forwarding table is implemented in a data plane.

14. The non-transitory computer-readable medium of claim 10, wherein the routing tree is one or more of a radix tree, a Patricia tree, or a trie.

15. A system comprising:
 a ternary content-addressable memory (TCAM) to store a forwarding table associated with a routing device;
 means for maintaining route entries of a route table as nodes in a routing tree;
 means for compressing child nodes that have a common gateway with their respective parent nodes, wherein the means for compressing includes
  means for determining if the nodes have a equal-cost multi-path (ECMP), and
  means for compressing a child node with ECMP for which a number of equal-cost multi-paths (ECMPs) matches with the number of ECMPs of a respective parent node and a set of gateways of the child node matches with the set of gateways of the respective parent node; and
 means for installing the route entries associated with uncompressed nodes into a forwarding table of a routing device that employs longest prefix match (LPM) lookup to forward data packets.

16. The system of claim 15, wherein each route entry comprises an Internet Protocol (IP) prefix and a gateway.

17. The system of claim 15, further comprising a route manager database to store the route table.

18. The system of claim 15, wherein the routing tree is one or more of a radix tree, a Patricia tree, or a trie.

* * * * *